(12) United States Patent
Jansson et al.

(10) Patent No.: US 10,001,234 B2
(45) Date of Patent: Jun. 19, 2018

(54) PIPE COUPLING FOR A RISER FOR THE CONNECTION OF AN OIL OR GAS WELL TO AN OIL RIG

(75) Inventors: Tomas Jansson, Sandviken (SE); Erik Tyldhed, Gavle (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days. days.

(21) Appl. No.: 13/880,097

(22) PCT Filed: Oct. 17, 2011

(86) PCT No.: PCT/EP2011/068110
§ 371 (c)(1),
(2), (4) Date: Apr. 18, 2013

(87) PCT Pub. No.: WO2012/052401
PCT Pub. Date: Apr. 26, 2012

(65) Prior Publication Data
US 2013/0207388 A1 Aug. 15, 2013

(30) Foreign Application Priority Data
Oct. 18, 2010 (EP) .................................... 10187859

(51) Int. Cl.
*F16L 23/18* (2006.01)
*E21B 17/046* (2006.01)
(Continued)

(52) U.S. Cl.
CPC ............ *F16L 23/18* (2013.01); *E21B 17/046* (2013.01); *E21B 17/085* (2013.01); *F16L 27/073* (2013.01); *F16L 37/252* (2013.01)

(58) Field of Classification Search
CPC ...................................................... F16L 27/073
(Continued)

(56) References Cited

U.S. PATENT DOCUMENTS 4,153,281 A  5/1979 Ahlstone
4,471,965 A  9/1984 Jennings
(Continued)

FOREIGN PATENT DOCUMENTS

WO    2007117209 A1   10/2007

*Primary Examiner* — David Bochna
*Assistant Examiner* — James A Linford
(74) *Attorney, Agent, or Firm* — Corinne R. Gorski

(57) ABSTRACT

A pipe coupling includes a first and second connected tubular element forming an elongated tube and being connected by a connection arrangement that biases the first tubular element against the second tubular. An annular sealing element is provided between and overlapping opposed end portions of the elements. The annular sealing element has a generally T-shaped cross-section and includes a first portion that forms a stem of the T-shaped cross section and extends in a radial direction and defines the outer periphery thereof, and a second portion formed by two opposing flanges that form the cross-bar of the T-shaped cross section and define the inner periphery thereof. At least one of the flanges presents a rounded bulge forming an outer peripheral surface of one flange. The bulge is sealed with an inner periphery of one of the tubular elements and extends continuously around the circumference of the annular sealing element.

13 Claims, 5 Drawing Sheets

(51) Int. Cl.
*E21B 17/08* (2006.01)
*F16L 27/073* (2006.01)
*F16L 37/252* (2006.01)

(58) Field of Classification Search
USPC ......... 285/369; 277/608, 609, 612, 614, 602
See application file for complete search history.

(56) References Cited

U.S. PATENT DOCUMENTS

| | | |
|---|---|---|
| 4,709,933 A | 12/1987 | Adamek |
| 5,466,018 A | 11/1995 | Stobbart |
| 5,931,476 A * | 8/1999 | Ungchusri et al. ........... 277/603 |
| 6,106,024 A | 8/2000 | Herman |
| 6,932,355 B1 | 8/2005 | Hjertholm |
| 2002/0140184 A1 | 10/2002 | Janoff et al. |
| 2003/0155721 A1 | 8/2003 | Zheng |
| 2004/0094898 A1 | 5/2004 | Zheng |
| 2004/0124719 A1* | 7/2004 | Aoshima et al. ........... 310/49 R |
| 2010/0117387 A1* | 5/2010 | Axelrod ........................ 294/1.4 |

* cited by examiner

PIPE COUPLING FOR A RISER FOR THE CONNECTION OF AN OIL OR GAS WELL TO AN OIL RIG

RELATED APPLICATION DATA

This application is a § 371 National Stage Application of PCT International Application No. PCT/EP2011/068110 filed on Oct. 17, 2011 claiming priority of European Application No. 10187859.3, filed Oct. 18, 2010.

TECHNICAL FIELD

The present invention relates to a pipe coupling comprising a first tubular element and a second tubular element connected to the first tubular element and forming an elongated tube therewith, wherein the first tubular element is connected to the second tubular element by a connection arrangement that permits a biasing of the first tubular element in relation to the second tubular element within a predetermined angular range. The coupling includes an annular sealing element provided between and overlapping opposing end portions of the first and the second tubular elements, wherein the annular sealing element has a generally T-shaped cross-section. The sealing element includes a first portion that forms a stem of the T-shaped cross section and extends in a radial direction of the sealing element and defines the outer periphery thereof. A second portion formed by two opposing flanges that form the cross-bar of the T-shaped cross section define the inner periphery of the annular sealing element. A first of the flanges overlaps and is in sealing contact with an inner circumferential surface of the first tubular element, and the second flange overlaps and is in sealing contact with an inner circumferential surface of the second tubular element.

In particular the invention relates to arrangements in which the above-mentioned first and second tubular elements form part of a pipe which, when in its operative position, is subjected to an elevated inner pressure acting on the sealing element in such a way that the outer peripheries of said first and second flanges are pressed by the action of said elevated pressure towards the inner periphery of the respective tubular element that they overlap.

An application for which the pipe coupling according to the invention is found to be particularly advantageous is an application in which the above-mentioned first and second tubular elements form part of a riser that connects an oil or gas well to an oil rig. Such a riser may be of substantial length and normally comprises a series of tubes that are connected to each other by means of tubular elements as mentioned above. The tubular elements will be subjected to bending and biasing due to the action of the surrounding sea, and the pressure inside them will, at times, be considerable.

BACKGROUND OF THE INVENTION

Risers for the connection of an oil or gas well to an oil rig are well known in prior art. Normally a riser may extend several hundred meters or even several kilometers from the well up to an off-shore rig. A riser is formed by a plurality of tubes, normally with a length of approximately 10 meters, which are interconnected to each other by means of pipe couplings that are specifically adapted to the requirements and conditions of this kind of application. During normal operation of the riser, the latter is used for the purpose of conducting oil or gas from the well to the rig. However, in cases when maintenance work is required anywhere along the riser or in the region of the top of the well, for example in the region of the well head and the blow out preventer, the riser may be used for the purpose of transporting necessary maintenance equipment down to the maintenance site. These are, however, all well known properties and functionalities of off-shore risers.

Normally, the tubes by which the riser is assembled are delivered as plain tubes to the off-shore plant in which they are to be used. There, specific coupling elements are attached the ends of each tube such that the latter can be effectively connected to each other in order to actually build the riser. Preferably, coupling elements that define bayonet couplings are used for this purpose. Thereby, the coupling elements that are attached to tubes may in fact form part of the tubes. For example, a tubular coupling element, forming a female part in a pipe coupling, may be welded to one end of one of the above-mentioned tubes, thereby forming an elongation of said tube. A tubular coupling element, forming a male part in said pipe coupling, is welded to the other end of said tube. Tubes equipped with such tubular coupling elements are then connected to each other, one at a time, with interacting male and female parts.

Pipe couplings of prior art comprise an annular sealing element which is provided between and overlaps opposing ends of first and the second tubular elements that are to be interconnected by a pipe coupling. The annular sealing element has a T-shaped cross-section, wherein said sealing element comprises a first portion that forms a stem of said T-shaped cross section and extends in a radial direction of the sealing element and defines the outer periphery thereof, and a second portion formed by two opposing flanges that form the cross-bar of the T-shaped cross section and define the inner periphery of the annular sealing element. A first of said flanges overlaps and is in sealing contact with an inner circumferential surface of the first tubular element, and the second flange overlaps and is in sealing contact with an inner circumferential surface of the second tubular element. During operation, the elevated pressure inside the tubular elements will press the flanges of the sealing element towards the inner periphery of the respective tubular element that they overlap.

However, the pipe couplings, typically of bayonet type, are of such design that they permit a certain displacement of the interconnected tubular elements in relation to each other, in axial direction as well as by means of biasing. Thereby, there will also be a slight displacement between the contact surfaces of the sealing element and the corresponding surface of the respective tubular element and, as a consequence thereof, certain wear on said surfaces.

Sealing elements of prior art, as defined above, have generally flat sealing surfaces by means of which they abut an inner periphery of the tubular element with which they interact in a sealing manner. In order to adopt motions such as biasing of adjacent tubular elements in relation to each other, the flanges of the sealing elements of prior art may be designed such that they flex somewhat when subjected to forces caused by such motions. However, it has been found that there is still considerable wear on said sealing surfaces, which in the long run will lead to less good sealing capacity.

THE OBJECT OF THE INVENTION

It is an object of the present invention to present a pipe coupling in which the design of the sealing element will result in improved wear properties of the sealing in combination with a sufficient sealing capacity thereof.

The design of the sealing element shall be such that, at an elevated pressure that can be assumed to exist inside the joined tubular elements during use thereof, the sealing element shall able of undergoing at least some elastic deformation in a zone in which it is in sealing contact with the tubular element, and have a geometry that promotes a long life of the sealing element in its operational state.

SUMMARY OF THE INVENTION

The object of the invention is achieved by means of the initially defined pipe coupling characterised in that at least one of the first and second flanges presents a rounded bulge that forms an outer peripheral surface of said flange, and that is in sealing contact with an in inner periphery of one of said tubular elements and extends continuously around the circumference of the annular sealing element. Upon biasing motion of the tubular element in relation to the tubular element connected thereto by the pipe coupling and in relation to the sealing element, the inner periphery of the tubular element will be permitted to perform a rolling motion on the outer periphery of the bulge. Thereby, sealing will still be achieved and the wear on the sealing element will be reduced in relation to solutions of prior art. Preferably, the bulge is continuously rounded, such that there is no discontinuity in the contact between the latter and the surface of the tubular element when there is displacement between them due to biasing of the tubular elements in relation to each other. Continuity of the rounding also contributes to less wear and less risk of having crack initiation in the region of the bulge.

Preferably, the flange on which the bulge is provided has a length L in a longitudinal direction thereof as seen from the first portion from which said flange extends, and said bulge has a height that varies along the longitudinal direction of the flange, wherein the dimension of said bulge increases towards a centre region of the bulge.

Preferably, the flange on which the bulge is provided has a length L in a longitudinal direction thereof as seen from the first portion from which said flange extends, wherein said bulge extends along a major part of the length L of said flange.

According to yet an embodiment, the periphery of said bulge defines a part of an ellipse, wherein the large radius of said ellipse extends in the longitudinal direction of the flange on which the bulge is provided.

According to one embodiment, the material of said bulge has a lower elasticity module than the material of the part of tubular element with which it is in sealing contact. Thereby, provided that there is a sufficiently elevated inner pressure in the tube formed by the tubular elements, the bulge will undergo a slight elastic deformation in the region in which it contacts the tubular element. Thereby, the area of the sealing surface is somewhat increased, which improves the sealing result.

According to a preferred embodiment, said bulge is covered with a coating of a material that has a lower friction coefficient than that of the material of said bulge. Thereby, wear on the sealing element as well as the tubular element is reduced. It is also preferred that said coating material has a higher wear resistance than the material of said bulge.

The coating material is a molybdenum disulphide-based coating. For example, such coating is the MoST™ coating which is a solid lubricant low friction coating based on molybdenum disulphide that offers high resistance to adhesive and abrasive wear and which has a load bearing limit in excess of 3 GPa. The MoST™ coating offers an ultra low coefficient of friction (0.01-0.06), much lower than that of Teflon™ or graphite, and has a hardness of 1500-2000 Hv and an extremely low specific wear rate, $4 \times 10-17$ m^3/Nm.

It is preferred that each of said flanges is provided with a respective bulge as defined in this patent application.

According to a preferred embodiment, the first and second tubular elements form part of a pipe which, when in its operative position, is subjected to an elevated inner pressure acting on the sealing element in such a way the outer peripheries of said first and second flanges are pressed by the action of said elevated pressure towards the inner periphery of the respective tubular element that they overlap.

Preferably, the first and second tubular elements form part of a riser that connects an oil or gas well to an oil rig. The major function of the pipe coupling is to interconnect tubes by means of which the major part of the riser is formed, each such tube having a considerable length, normally in the range 5-15 meters. The tubular elements of the pipe coupling are attached, preferably by means of welding to a respective tube of the riser, and then the tubes are interconnected by interconnection of the tube elements. Preferably this is done on site, i.e. off shore. However, the pipe coupling of the invention may also be used for connection of other parts of the riser, such as for connection of an end tube of the riser with any further component, for example at the well head or at the top site.

Further features and advantages of the present invention will be presented in the following detailed description of a preferred embodiment and in the annexed patent claims.

BRIEF DESCRIPTION OF THE DRAWINGS

In the following, an embodiment of the invention will be described by way of example with reference to the accompanying drawing, on which.

DETAILED DESCRIPTION OF THE INVENTION

Figure 1:
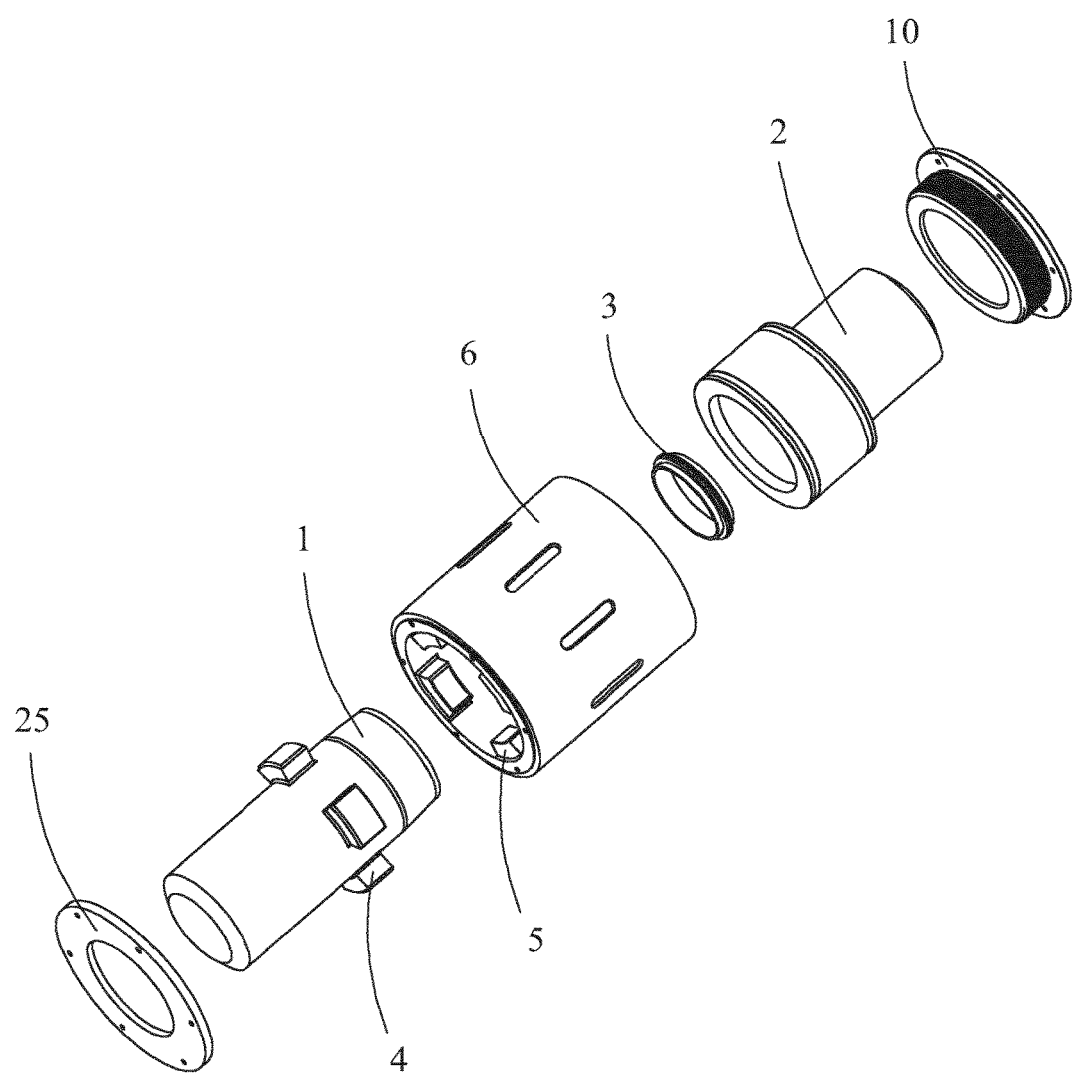
FIG. 1 is an exploded perspective view of a pipe coupling according to the present invention.
Figure 2:
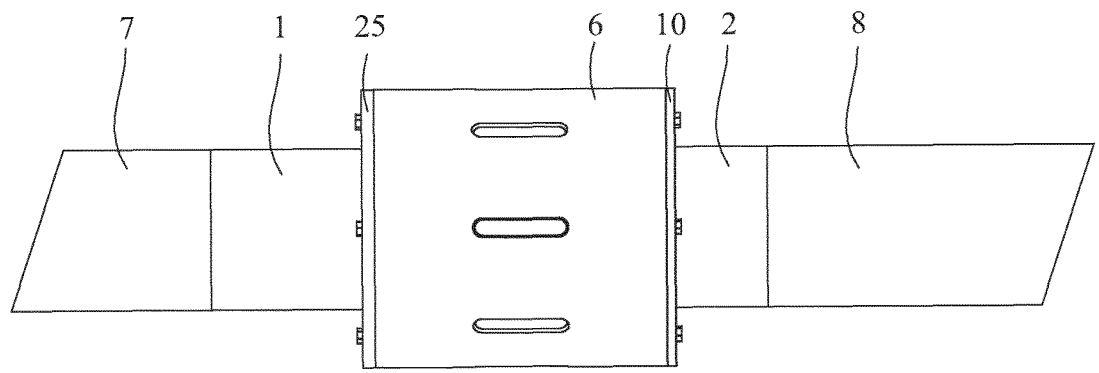
FIG. 2 is a side-view of the pipe coupling shown in FIG. 1.
Figure 3:
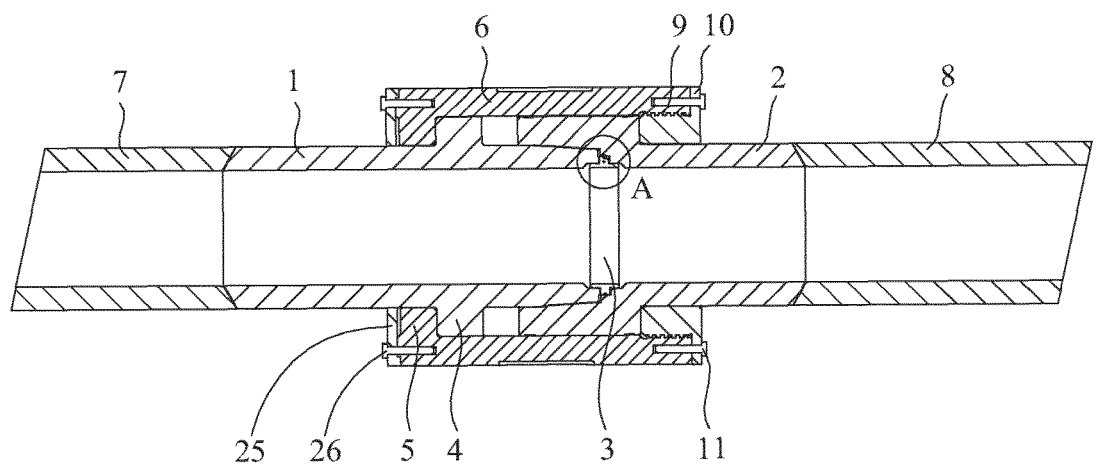
FIG. 3 is a cross-section of the pipe coupling shown in FIGS. 1 and 2, in an assembled state.
Figure 4:
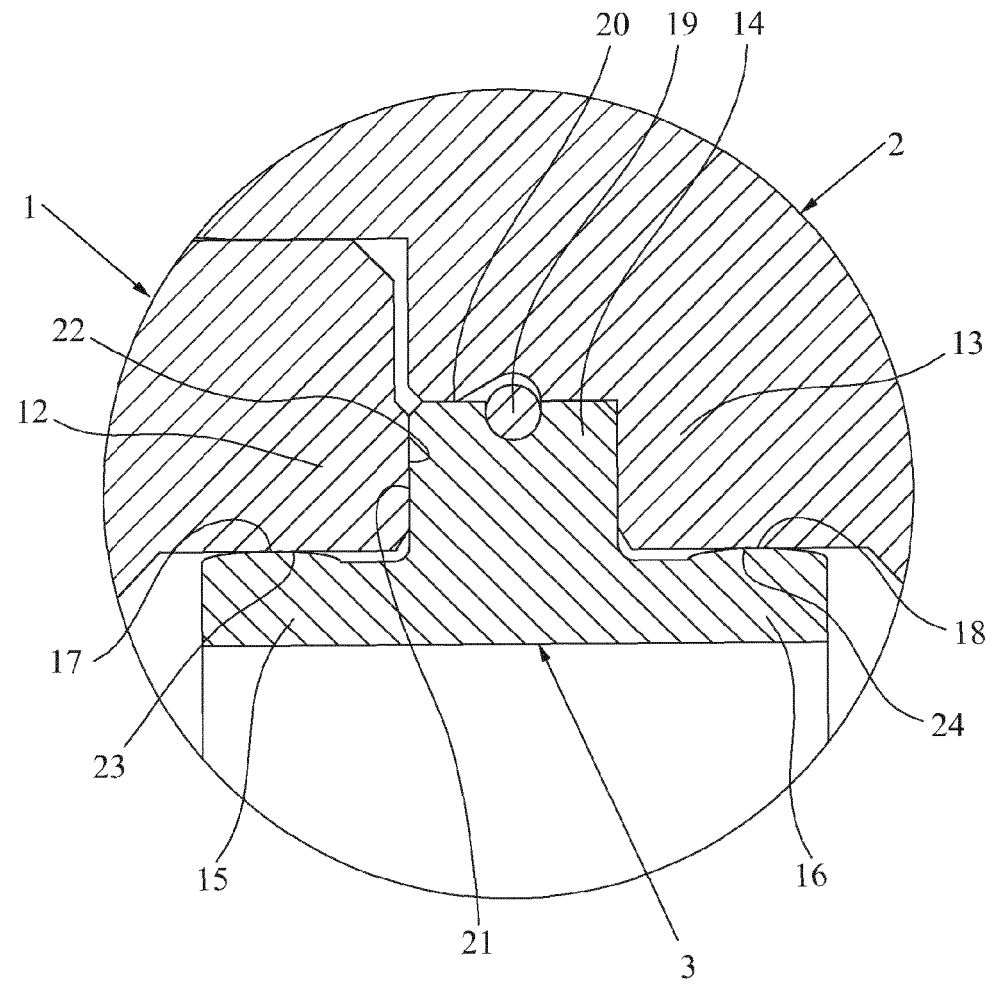
FIG. 4 is an enlarged view of the pipe coupling shown in FIG. 3, during assembly.
Figure 5:
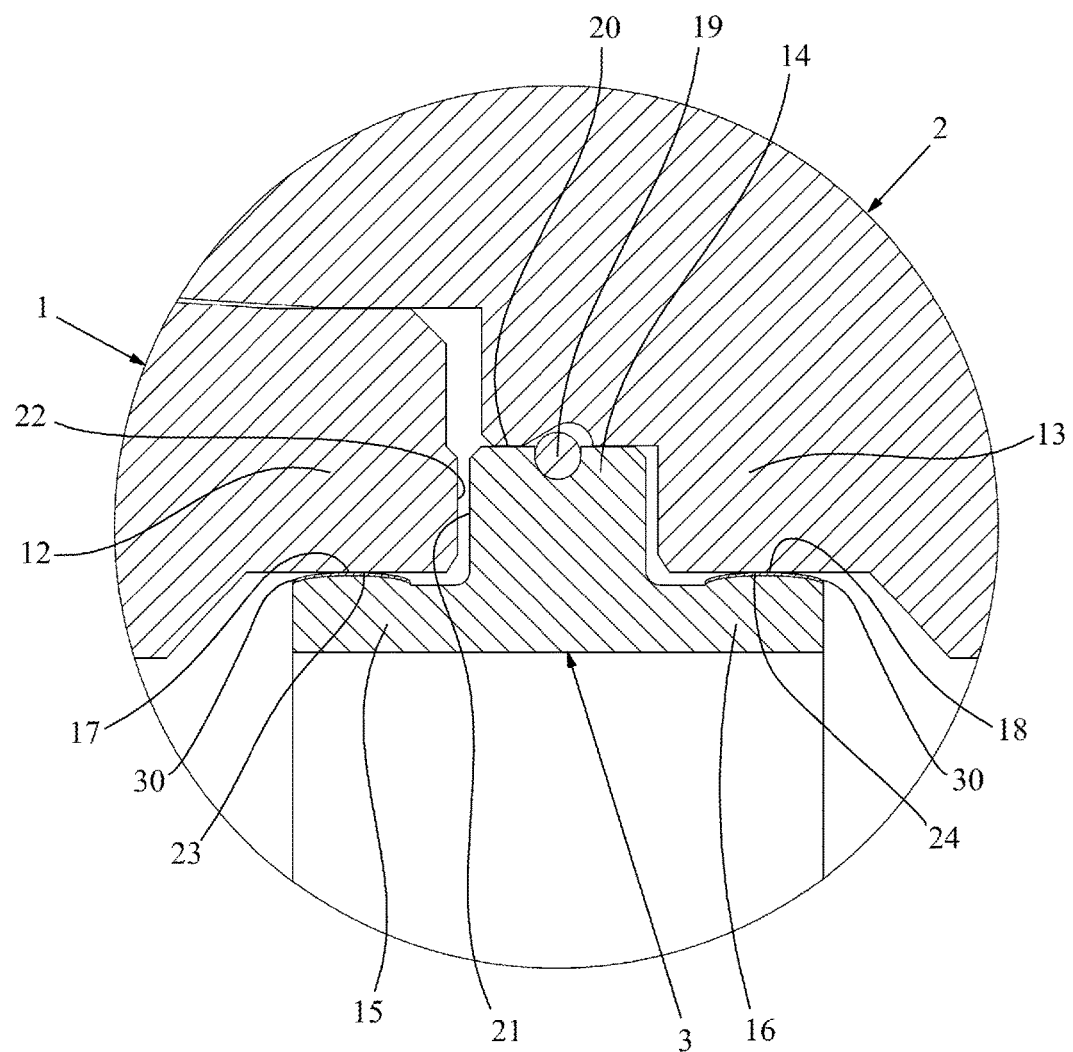
FIG. 5 is an enlarged view corresponding to the one shown in FIG. 4, but showing the pipe coupling after assembly and subjected to an inner pressure and axial tension force.

FIGS. 1-5 show a pipe coupling according to the invention. The pipe coupling comprises a first tubular element 1, a second tubular element 2, and an annular sealing element 3. As can be seen in FIGS. 3-5, which show the pipe coupling in assembled state, the sealing element is provided between and overlaps opposing ends of the first and the second tubular elements 1, 2 when being arranged in its operative position. There are also provided engagement members 4, 5 for engaging and interlocking the first tubular element 1 with the second tubular element 2. The engagement members 4, 5 are arranged so as to function as a bayonet coupling between the first tubular element 1 and the second tubular element 2. With reference to the figures it can be seen that in the particular embodiment presented here, there is provided a sleeve 6 which is attached to the second tubular element 2 and which carries the engagement members 5 associated to that specific tubular element. The bayonet coupling according to the invention will permit a predetermined biasing of adjacent interconnected tubular elements 1, 2 in relation to each other, the degree of biasing being up to approximately 1°, in most cases, though, only up to approximately 0.5°. The sealing element 3 is designed in such a way that it will cope with such biasing and yet provide an efficient sealing functionality. The specific design of the interacting interlocking elements 4, 5 and the sealing element 3 will be further described in detail later.

According to a preferred embodiment the pipe coupling according to the invention forms part of an elongated pipe subjected to substantial inner pressure during operative conditions. In a typical and preferred application, the pipe forms a so-called riser extending through open sea from a gas well or oil well to an off-shore rig. Such a pipe comprises a plurality of tubes, each typically having a length of approximately 10 meters, which are interconnected by pipe couplings according to the invention. The total length of the pipe may be up to several kilometers. When installed in open sea, the pipe will be subjected to the motions of the sea, thereby inducing a bending force on the pipe, as well as an axial load caused by the own weight of the pipe. Moreover, during operation, when a pressurised medium, such as gas or oil is conducted through the pipe, the latter will be subjected to an elevated inner pressure, which typically may be up to 15000 psi.

Tubes that are to be interconnected by means of the pipe coupling of the invention have been indicated with reference number 7, 8 in FIGS. 2 and 3. The tubes 7, 8 that form the pipe are made of metal and in the case of a riser preferably made of a suitable steel grade, preferably a stainless steel grade. The tubular elements 1, 2 of the pipe coupling according to the invention are also made of metal, preferably a suitable steel grade, preferably a stainless steel grade, and most preferably a duplex stainless steel grade. The first tubular element 1 of the pipe coupling according to the invention, or more precisely an end thereof, is connected to an end of a first tube 7, preferably by means of a weld. The second tubular element 2 is, in its turn, connected to a second tube 8, preferably by means of weld in the region in which the second tubular element 2 and the second tube 8 meet. However, it should be understood that, if from a manufacturing point of view deemed as possible and preferred, the tubular elements 1, 2 could as well be integrated parts of the tubes 7, 8.

The first tube 7 is connected to the second tube 8 by interlocking engagement between the first tubular element 1 of the first tube 7 and the second tubular element 2 of the second tube 8, i.e. by means of the bayonet coupling defined by the pipe coupling according to the invention. The opposite end of either the first tube 7 or the second tube 8 is connected to a further first or second tubular element 1, 2 which is used for interconnecting that tube with a further tube (provided with a corresponding second or first tubular element 2, 1 according to the invention), and so on. In this way, a whole series of interconnected tubes, forming a riser, is built. Such building of a riser is, preferably, done on site on an off-shore rig from which the riser is to extend down to a predetermined well, to the wellhead of which the riser is connected, possibly by means of a pipe-coupling according to the present invention.

The riser extending through open sea will be subjected to repeated bending motions due to the motions of the sea. The stiffness of the tubes will off course be decisive for the degree of bending thereof. However, a certain biasing of adjacent tubes 7, 8 through biasing of adjacent, interconnected first and second tubular elements 1, 2, as mentioned earlier, will contribute to the ability of the riser to adopt bending motions. The ability of the pipe couplings to adopt a biasing between interconnected first and second tubular elements thereof comes as a consequence of the design of the coupling, especially the provision of the engagement members 4, 5 and the sealing element 3.

The first tubular element 1 is provided with first engagement members 4 formed by a plurality of tabs 4 provided on the outer periphery thereof. The tabs 4 are distributed with spaces between them around the circumference of the first tubular element 1. The second tubular element 2 carries corresponding second engagement members 5, also formed by tabs 5. However, these second engagement members are provided on the inner periphery of the sleeve 6 which is connected to the second tubular element 2 and may be regarded as a part of the latter. The sleeve 6 is connected to second tubular element 2 through a screw joint 9, formed through the interaction of a threading on an inner periphery of the sleeve 6 and a corresponding threading on the outer periphery of a part of the second tubular element 2. There are provided locking means by means of which the sleeve 6 is prevented from being unscrewed from the second tubular element 2. The second tubular element 2 comprises a flange 10 facing the sleeve 6. Said locking means may include screws 11 extending through the flange 10 and into the sleeve 6 in an axial direction (with regard to the axial direction of the first and second tubular parts 1, 2). The flange 10 may an integral or, as shown in the figures, a non-integral part of the second tubular element 2. It may be rotatable in relation to the remaining part of the tubular element 2 on which it is attached or it may be non-rotationally attached thereto, for example by means of a weld. The sleeve 6 extends beyond an end of the second tubular element 2 (sleeve excluded), and the second engagement members 4 are arranged on the inner periphery of the sleeve 6 in this free end of the sleeve 6. It should be understood that the provision of the sleeve 6 as a separate part is preferred from a production point of view. However, the sleeve 6 could, as an alternative, be an integrated part of the second tubular element 2, and formed as one piece therewith.

The free end of the sleeve 6, in which the second engagement members are provided with spaces between them on the inner circumference of the sleeve 6, forms a space into which the first tubular element 1 can be inserted through a translational motion in an axial direction thereof. The first engagement members 4 of the first tubular element 1 have such a distribution and such angular spacing between them that the second engagement members 5 of the second tubular element 2 are permitted to pass between those first engagement members 4 when the first tubular element is inserted into the second tubular element 2 (including sleeve 6). Subsequent to the insertion of the first tubular element 1 into the second tubular element 2 in an axial direction, the first and second tubular elements 1, 2 are rotated such that the first and second engagement members 4, 5 become in alignment with each other and block, according to the bayonet-coupling principle, against withdrawal of the first tubular element 1 from the second tubular element 2 in an axial direction.

Before insertion of the first tubular element 1 into the second tubular element 2, the sealing element 3 is mounted in a seat in the second tubular element 2. This seat is arranged at an end portion 13 of the inner periphery of the second tubular element 2, such that a flange of the sealing element 3 will be able of overlapping said inner periphery. From the end portion 13 of the inner periphery at which the seat for the sealing element 3 is arranged, the second tubular element 2 extends further, but with a larger inner diameter, and defines a space into which a part of the first tubular element 1 can be inserted. According to the principle of the invention, when the coupling between the first and second tubular elements 1, 2 has been established, the sealing element 3 is seated between and overlaps opposing end portions 12, 13 (see FIG. 4-6) of the first and the second tubular elements 1, 2. The sealing element has a generally T-shaped cross-section, and it comprises a first portion that forms a stem 14 of said T-shaped cross section and extends in a radial direction of the sealing element 3 and defines the outer periphery thereof, and a second portion formed by two opposing flanges 15, 16 that form the cross-bar of the T-shaped cross section and define the inner periphery of the annular sealing element 3. A first flange 15 of said flanges 15, 16 overlaps and is in sealing contact with an inner circumferential surface 17 of the first tubular element 1, and the second flange 16 overlaps and is in sealing contact with an inner circumferential surface 18 of the second tubular element 2. A circumferentially extending groove at the end 13 of the second tubular element 2 forms a seat or pocket in which the first portion 14 of the sealing element 3 is accommodated when the sealing is in its operative position. Said groove is open towards the space to be occupied by the end 12 of the first tubular element 1 when assembled. The sealing element 3 is mounted in the second tubular element 2 by means of displacement of the sealing element 3 in the axial direction of the latter, into said seat.

At the outer peripheral surface of the first portion 14, there is provided a circumferentially extending groove in which there is provided an o-ring 19, made of a softer material than that of the sealing element 3 and serving as a means for facilitating mounting of the sealing element 3. Preferably, the o-ring is made of a suitable polymer material or a rubber. It does not fulfill a sealing function, or only fulfils a sealing function up to a limited pressure, substantially below the conceived elevated pressure that will exist in pipe during its operative use. Primarily, the o-ring 19 merely serves to hold the sealing in position in the groove at the end 13 of the second tubular element 2 by applying a pressure against a bottom surface 20 of said groove. In fact the o-ring 19 could, as an alternative, be substituted by one or more separate pieces of material provided in one or more recesses in the outer periphery of the first portion 14, as long as this or these pieces of material present(s) the same positioning functionality as the o-ring 19.

The width of the groove that accommodates the first portion 14 of the sealing element 3 is approximately the same as the width of the first portion 14 of the sealing element 3. A lateral surface 21 of the first portion 14 of the sealing element 3 forms an abutment surface towards a corresponding abutment surface 22 provided at the end portion 12 of the first tubular element 1. When the first tubular 1 element is inserted to a maximum into the second tubular element 2, said abutment surfaces 21, 22 abut each other and prevent further insertion (FIG. 4). When the first tubular element 1 is rotated into a locked position with its tabs 4 in alignment with the tabs 5 of the second tubular element 2, the distances between the respective abutment surfaces and the associated tabs are such that the first tubular element 1 is permitted to return a predetermined distance, preferably not more than 1 mm, such that a gap is created between said abutment surfaces 21, 22 (FIG. 5), whereby the sealing element 3 is in a floating position in the axial direction of the tubular elements 1, 2. The first situation, in which there is an abutment between said abutment surfaces 21, 22, is shown in FIG. 4, while the second situation, which appears when there is a substantial axial load on the coupling, is shown in FIG. 5. When a riser is being used under operative conditions there will be such axial load and the sealing element 3 will be in the floating position shown in FIG. 5.

In order to prevent the bayonet coupling from unlocking, there is provided a further locking means, formed by flange 25 on the outer periphery of the first tubular element 1. The further flange 25 is attached to the first tubular element 1 in a non-rotational manner, for example by being an integrated part thereof, or by means of a suitable attachment means, preferably a weld joint. Locking means, here exemplified by bolts 26, for preventing rotation between the flange 25 and the sleeve 6 are provided. The locking means, however, permits the above mentioned, small axial displacement of the sleeve 6, and thereby the second tubular element 2, in relation to the first tubular element. In the disclosed embodiment this is achieved as the bolts 26 do not engage the sleeve 6 by any kind of screw joint, but merely penetrates the latter in the axial direction of the coupling.

At least one of said first and second flanges 15, 16, and in this preferred embodiment each of said flanges, presents a rounded bulge 23, 24 that forms an outer peripheral surface of said flange 15, 16, wherein the bulge 23, 34 is in sealing contact with an in inner periphery 17, 18 of the associated tubular element 1, 2 and extends continuously around the circumference of the annular sealing element 3. When there is a misalignment of the inner peripheries 17, 18 due to biasing of the first and second tubular elements 1, 2 in relation to each other, these peripheries 17, 18 will be able of performing a kind of rolling motion on the top of the respective bulge 23, 24. The bulges 17, 18, like the rest of the sealing element 3, are made of a metal of lower elasticity module than the material of the tubular elements 1, 2 that they abut. Preferably, in order to present good corrosion properties and sufficient mechanical properties, the sealing element 3, together with its bulges 17, 18, is made of a titanium-based alloy.

Figure 6:
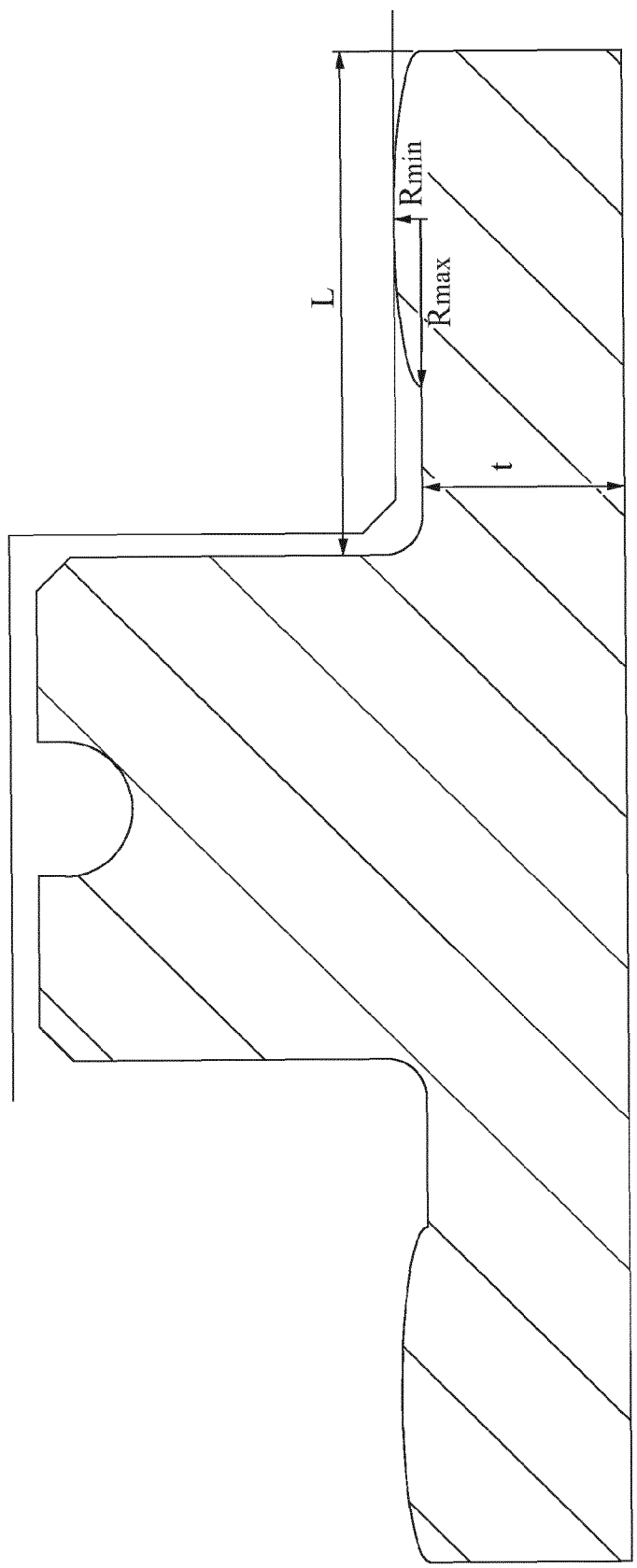
FIG. 6 is a further enlarged view showing a cross section of an annular sealing element according to the invention.

With reference to FIG. 6, which is a cross section taken through a radial plane of the annular sealing element 3 and accordingly a cross section through said bulge 23, 24, each flange 15, 16 has a length L in a longitudinal direction thereof as seen from the first portion 14 from which said flange 15, 16 extends, and the bulge 23, 24 provided thereon has a height that varies along the longitudinal direction of the flange 15, 16, wherein the dimension of said bulge 23, 24 increases towards a centre region of the bulge. The cross-section of the bulge is symmetric, i.e. the slope is equal on both sides of said centre region of each bulge 23, 24.

The outer periphery of the bulge 23, 24, i.e. the surface thereof which can be assumed to be in sealing contact with the associated inner periphery 17, 18 of the respective tubular element 1, 2, presents a predetermined radius of curvature, which is determined on basis of
- the difference in elasticity module between the bulge material and the material of the tubular element that it abuts,
- the elasticity module of the bulge material, in absolute terms,
- the maximum biasing that can be assumed between the first and second tubular elements 1, 2, and the assumed maximum pressure existing in the tubular elements 1, 2, which will press the bulges 23, 24 towards the respective inner peripheries.

Thereby, the bulge 23, 24 shall be stable enough to stand the pressure that it will be subjected to during use, but also elastic enough to elastically deform somewhat upon such pressure, such that a maintained sealing is achieved. If the radius is too small, the bulge will be worn down during use, which is detrimental to the sealing functionality thereof. If, on the other hand, the radius is too large, this will have a negative impact on the sealing capability of the sealing element 3 from the very beginning of its use, which is an unwanted property. Accordingly, proper adaptation of the radius with regard to the above-mentioned parameters is essential.

The flange 15, 16 on which the bulge 23, 24 is provided has a length L in a longitudinal direction thereof as seen from the first portion from which said flange 15, 16 extends, wherein said bulge extends along a major part of the length L of said flange 15, 16. Each of the bulges 23, 24 extends to the free end of its respective flange 15, 16. The flanges 15, 16 will present some flexibility, such that a flexing thereof will also contribute to a smooth contact between the bulge 23, 24 and the contact surface 17, 18 of the first and second tubular element 1, 2 respectively. During use of the sealing element 3, the end of the stem 14 is assumed to abut the bottom of the groove in the second tubular element 2 into which the stem 14 penetrates. According to one embodiment, the stem 14 of the sealing element 3 may be slightly shorter than said depth such that, when the elevated pressure acts on the sealing element 3 during use of the latter, there will be a predetermined slight flexing of the flanges 15, 16. Thereby, it is further secured that there is a sufficient sealing pressure between the bulges 23, 24 and their respective sealing surfaces 17, 18.

According to the embodiment shown in FIG. 6, the periphery of at least one, preferably each of the bulges 23, 24 defines a part of an ellipse, wherein the large radius $R_{max}$ of said ellipse extends in the longitudinal direction of the flange 15, 16 on which the bulge 23, 24 is provided.

According to a preferred embodiment, the first and second tubular elements 1, 2 are made of stainless steel having an elasticity modulus so high that it will essentially not elastically deform due to the impact of the bulges 23, 24 of the sealing element 3 upon application of a predetermined pressure, corresponding to the maximum pressure expected during use. The sealing element 3 is made of a titanium-based alloy with an elasticity module (in this specific case approximately half the one of the material of the first and second tubular elements 1, 2) such that the bulges 15, 16 will deform elastically, but not plastically, upon application of said predetermined pressure. In quantitative figures, the e-module of the material of the first and second tubular elements 1, 2 was 210 000 MPa, while the e-module of the material of the sealing element was 105 000 MPa. Tests were performed with different sealing element geometries. The pressure acting on the sealing element was 15000 psi, and the maximum biasing of the first tubular element 1 in relation to the second tubular element 2 was 0.5°. The thickness t of the flanges 15, 16, essential for the flexibility thereof and how much load must be taken by the bulges 23, 24, was found to be one important measure, as well as the length L of the flanges 15, 16 and the maximum radius $R_{max}$ and minimum radius $R_{min}$ of each bulge 23, 24 (the peripheries of the bulges 23, 24 defining half ellipses). A preferred combination of measures was found to be:

L: 15 mm
t: 2.6 mm
$R_{min}$: 0.2 mm
$R_{max}$: 5.0 mm

According to the invention the bulges 23, 24 are covered with a thin coating of a material that has a lower friction coefficient than that of the material of said bulge. Thereby, wear on the sealing element 3 as well as each tubular element 1, 2 is reduced. It is also preferred that said coating material has a higher wear resistance than the material of said bulge 23, 24. Preferably, it also presents a higher hardness than the material of the bulges 23, 24. The coating is indicated by reference numeral 30. But it should be understood that the bulges 23, 24, and possibly the whole sealing element 1, are covered with 4 coating 30.

Preferably, said coating material is a molybdenum disulphide-based coating. An advantageous such coating is the MoST™ coating which is a solid lubricant low friction coating based on molybdenum disulphide that offers high resistance to adhesive and abrasive wear and which has a load bearing limit in excess of 3 GPa. The MoST™ coating offers an ultra low coefficient of friction (0.01-0.06), much lower than that of Teflon™ or graphite, and has a hardness of 1500-2000 Hv and an extremely low specific wear rate, 4×10−17 m^3/Nm. The coating is applied to the sealing element 3 by means of any suitable deposition method, preferably physical vapor deposition (PVD) in the case of molybdenum disulphide-based coatings.

The invention claimed is:

1. A pipe coupling comprising;
   a first tubular element;
   a second tubular element connected to the first tubular element and forming an elongated tube therewith, the first tubular element being connected to the second tubular element by a connection arrangement arranged to bias the first tubular element in relation to the second tubular element within a predetermined angular range, the connection arrangement including a plurality of engagement members that engage and interlock the first tubular element with the second tubular element; and
   an annular sealing element movably disposed between and overlapping opposing end portions of the first and the second tubular elements, wherein the annular sealing element has a generally T-shaped cross-section, said sealing element including a first portion that forms a stem of said T-shaped cross section and extends in a radial direction of the sealing element and defines the outer periphery thereof and a second portion formed by two opposing flanges that form a cross-bar of the T-shaped cross section, such that an upper surface of each of the flanges, respectfully, are perpendicular to side surfaces of the stem, the flanges defining an inner periphery of the annular sealing element, wherein a first of said flanges overlaps and is in sealing contact with an inner circumferential surface of the first tubular element, and a second flange overlaps and is in sealing contact with an inner circumferential surface of the second tubular element, at least one of said first and second flanges including a rounded bulge extending to a longitudinal outermost peripheral surface of its respective flange and longitudinally to its corresponding flange's upper surface, the bulge being in sealing contact with the inner periphery of one of said first or second tubular elements and extending continuously around the circumference of the annular sealing element, wherein each of the bulge includes a coating of material, wherein each bulge extends radially outward beyond its corresponding flange's upper surface and wherein each bulge longitudinally covers a greater portion of its corresponding flange than the upper surface of the same corresponding flange.

2. The pipe coupling according to claim 1, wherein each of said first and second flanges on which the bulge is provided has a length in a longitudinal direction thereof as seen from the first portion from which said respective flange extends and that said bulge has a height that varies along the longitudinal direction of the respective flange, wherein the dimension of said bulge increases towards a center region of the bulge.

3. The pipe coupling according to claim 1, wherein said respective flange on which the bulge is provided has a length in a longitudinal direction thereof as seen from the first portion from which said respective flange extends, wherein said bulge extends along a major part of the length of said respective flange.

4. The pipe coupling according to claim 1, wherein a periphery of said bulge defines a part of an ellipse, wherein a large radius of said ellipse extends in the longitudinal direction of the respective flange on which the bulge is provided.

5. The pipe coupling according to claim 1, wherein a material of said bulge has a lower elasticity module than a material of the part of tubular element with which it is in sealing contact.

6. The pipe coupling according to claim 1, wherein the material of the coating of the bulge has a lower friction coefficient than the material of said bulge.

7. The pipe coupling according to claim 6, wherein said material of the coating has a higher wear resistance than the material of said bulge.

8. The pipe coupling according to claim 6, wherein said material of the coating is molybdenum disulphide-based.

9. The pipe coupling according to claim 1, wherein each of said first and second flanges is provided with a bulge.

10. The pipe coupling according to claim 1, wherein the first and second tubular elements form part of a pipe which, when in its operative position, is subjected to an elevated inner pressure acting on the sealing element in such a way the outer peripheries of said first and second flanges are pressed by the action of said elevated pressure towards the inner periphery of the respective tubular element that they overlap.

11. The pipe coupling according to claim 1, wherein the first and second tubular elements form part of a riser.

12. The pipe coupling according to claim 11, wherein at least one of said first and second tubular elements is connected to a tube of said riser.

13. The pipe coupling according to claim 1, wherein the second tubular member includes a circumferentially extending groove at an end thereof, the groove forming a seat arranged to receive the first portion of the sealing element when the sealing element is in an operative position.

* * * * *